(12) United States Patent
Shimizu et al.

(10) Patent No.: US 12,498,482 B2
(45) Date of Patent: Dec. 16, 2025

(54) CAMERA APPARATUS

(71) Applicant: Maxell, Ltd., Kyoto (JP)

(72) Inventors: Hiroshi Shimizu, Kyoto (JP); Osamu Kawamae, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 17/057,709

(22) PCT Filed: May 30, 2018

(86) PCT No.: PCT/JP2018/020815
§ 371 (c)(1),
(2) Date: Nov. 23, 2020

(87) PCT Pub. No.: WO2019/229887
PCT Pub. Date: Dec. 5, 2019

(65) Prior Publication Data
US 2021/0231810 A1 Jul. 29, 2021

(51) Int. Cl.
*G01S 17/89* (2020.01)
*G01S 17/06* (2006.01)
(Continued)

(52) U.S. Cl.
CPC .............. *G01S 17/89* (2013.01); *G01S 17/06* (2013.01); *H04N 23/10* (2023.01); *H04N 23/64* (2023.01); *H04N 23/698* (2023.01); *H04N 23/72* (2023.01)

(58) Field of Classification Search
CPC .......... G01S 17/89; G01S 17/06; G01S 17/87; G01S 17/894; G01S 7/51; H04N 5/23238;
(Continued)

(56) References Cited

U.S. PATENT DOCUMENTS 5,606,627 A * 2/1997 Kuo ................... G06T 7/593
348/E13.067
5,699,444 A * 12/1997 Palm ................... G06T 7/73
348/E13.016
(Continued)

FOREIGN PATENT DOCUMENTS

EP 2863176 A2 4/2015
JP 2004-135208 A 4/2004
(Continued)

OTHER PUBLICATIONS

Japanese Office Action received in corresponding Japanese Application No. 2022-019213 dated Jan. 17, 2023.
(Continued)

*Primary Examiner* — Christopher S Kelley
*Assistant Examiner* — Asmamaw G Tarko
(74) *Attorney, Agent, or Firm* — Mattingly & Malur, PC

(57) ABSTRACT

Provided is a camera apparatus capable of measuring a distance to a subject omnidirectionally while capturing an image of the subject omnidirectionally, and storing data of the image and the distance in correspondence therebetween. The camera apparatus includes two camera devices installed at positions that enable omnidirectional imaging; and two distance measurement devices installed at positions that enable omnidirectional distance measurement. Image data of each of pixel positions captured by the camera devices and distance data of each of the pixel positions measured by the distance measurement devices are stored in a memory in association with the pixel positions. The two camera devices are installed on surfaces that face each other with respect to a principal surface of the camera apparatus, and the two distance measurement devices are installed on surfaces that face each other with respect to a surface orthogonal to the principal surface of the camera apparatus.

6 Claims, 12 Drawing Sheets

(51) Int. Cl.
*H04N 23/10* (2023.01)
*H04N 23/60* (2023.01)
*H04N 23/698* (2023.01)
*H04N 23/72* (2023.01)
*H04N 5/232* (2006.01)
*H04N 5/235* (2006.01)

(58) Field of Classification Search
CPC ............ H04N 5/23222; H04N 5/2352; H04N 5/2251; H04N 5/232; H04N 5/247; H04N 9/045; H04N 23/10; H04N 23/64; H04N 23/698; H04N 23/72; G02B 7/40; G03B 15/00; G03B 37/00
USPC .......................................................... 348/135
See application file for complete search history.

(56) References Cited

U.S. PATENT DOCUMENTS

| | | | | |
|---|---|---|---|---|
| 6,163,337 | A * | 12/2000 | Azuma | G06T 7/97 348/E13.071 |
| 6,185,663 | B1 * | 2/2001 | Burke | G06F 11/1471 714/E11.13 |
| 6,222,583 | B1 * | 4/2001 | Matsumura | G01C 21/3673 348/113 |
| 6,738,424 | B1 * | 5/2004 | Allmen | H04N 19/23 375/E7.084 |
| 7,085,423 | B2 * | 8/2006 | Tanigawa | G06T 9/001 382/175 |
| 8,743,424 | B2 * | 6/2014 | Shaham | H04N 1/58 358/1.9 |
| 9,607,358 | B2 * | 3/2017 | Takenaka | G06T 3/0062 |
| 11,259,142 | B1 * | 2/2022 | Dulee | G06F 16/951 |
| 2006/0127078 | A1 * | 6/2006 | Onozawa | G02B 7/282 396/103 |
| 2011/0115879 | A1 * | 5/2011 | Homma | H04N 5/2259 348/E7.091 |
| 2011/0193937 | A1 * | 8/2011 | Watanabe | H04N 13/111 348/E13.001 |
| 2013/0120224 | A1 * | 5/2013 | Cajigas | G06F 3/012 345/8 |
| 2013/0120534 | A1 * | 5/2013 | Sakamoto | G06T 15/205 348/46 |
| 2014/0347501 | A1 * | 11/2014 | Ishida | G06T 5/80 348/222.1 |
| 2015/0007319 | A1 * | 1/2015 | Antonov | G06F 21/56 726/23 |
| 2015/0062363 | A1 | 3/2015 | Takenaka et al. | |
| 2015/0242982 | A1 * | 8/2015 | Choi | G06T 11/00 382/106 |
| 2016/0117864 | A1 * | 4/2016 | Cajigas | G06F 3/012 345/633 |
| 2016/0300323 | A1 * | 10/2016 | Nakagawa | G06T 3/0062 |
| 2017/0085771 | A1 * | 3/2017 | Schwager | H04N 5/2352 |
| 2018/0253875 | A1 * | 9/2018 | Gorur Sheshagiri | G06T 3/4038 |
| 2018/0278916 | A1 * | 9/2018 | Kim | H04N 5/247 |
| 2018/0343388 | A1 * | 11/2018 | Matsushita | H04N 13/282 |
| 2019/0082113 | A1 * | 3/2019 | Yu | H04N 5/232121 |
| 2019/0145767 | A1 * | 5/2019 | Shimada | G01S 7/486 356/4.01 |
| 2020/0267374 | A1 * | 8/2020 | Kitago | H04N 13/282 |
| 2021/0041780 | A1 * | 2/2021 | Takenaka | G01C 11/02 |
| 2021/0190917 | A1 * | 6/2021 | Matsuura | G01S 17/10 |
| 2021/0227146 | A1 * | 7/2021 | Yu | G03B 13/36 |

FOREIGN PATENT DOCUMENTS

| | | |
|---|---|---|
| JP | 2006-189787 A | 7/2006 |
| JP | 2010-239416 A | 10/2010 |
| JP | 2013-214947 A | 10/2013 |
| JP | 2015-081921 A | 4/2015 |
| JP | 2017-17447 A | 1/2017 |
| JP | 2017-112526 A | 6/2017 |
| JP | 2017-188839 A | 10/2017 |
| WO | 2017/026705 A1 | 2/2017 |
| WO | 2017/138049 A1 | 8/2017 |

OTHER PUBLICATIONS

International Search Report of PCT/JP2018/020815 dated Jul. 31, 2018.

Japanese Office Action received in corresponding Japanese Application No. 2023-127075 dated Jul. 9, 2024.

Japanese Office Action received in corresponding Japanese Application No. 2023-127075 dated Jan. 7, 2025.

* cited by examiner

F I G. 1A
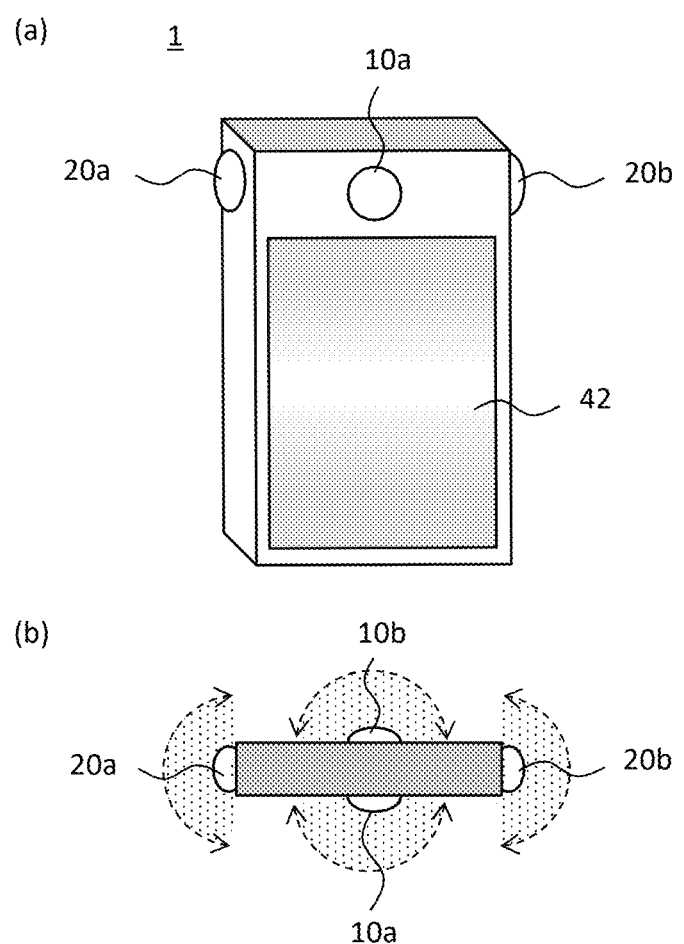

(a)

(b)

(a) SENSOR SURFACE OF CAMERA DEVICE

AA: LUMINANCE AND COLOR DIFFERENCE INFORMATION (b) SENSOR SURFACE OF DISTANCE MEASUREMENT DEVICE

BB: DISTANCE INFORMATION (a) IMAGE DATA (b) DISTANCE DATA

DATA FILE 300

IMAGING INFORMATION: IMAGING DATE AND TIME, STORAGE DATE AND TIME, CAMERA NAME, LENS NAME, SHUTTER SPEED, APERTURE VALUE, FILM MODE, ISO SENSITIVITY, IMAGING LOCATION COORDINATES, AND APPROXIMATE LOCATION NAME

CAMERA APPARATUS

TECHNICAL FIELD

The present invention relates to a camera apparatus that captures an image of a subject over a wide range and measures a distance to the subject.

BACKGROUND ART

In recent years, various 360-degree cameras (also referred to as omnidirectional cameras or celestial sphere cameras) have been announced. According to the 360-degree camera, images of all surrounding subjects can be simply captured with one shutter motion, and after imaging is performed, a desired part can be cut out and enjoyed freely.

In this regard, Patent Document 1 discloses an imaging apparatus (camera) which aims to generate a correct omnidirectional (celestial sphere) image in a vertical direction in response to arbitrary inclination of the imaging apparatus, and which is configured to include inclination detection means that detects an inclination of the imaging apparatus with respect to the vertical direction, correction means that corrects conversion data according to the inclination, the conversion data being obtained by converting plane coordinate values into spherical coordinate values, a plurality of imaging means, coordinate conversion means that converts the plane coordinate values of a plurality of pixels, which form images captured by the imaging means, into the spherical coordinate values based on the conversion data corrected by the correction means, and combination means that combine the images containing the plurality of pixels of which the plane coordinate values are converted into the spherical coordinate values by the coordinate conversion means.

CITATION LIST

Patent Document

Patent Document 1: JP 2013-214947 A

SUMMARY OF THE INVENTION

Problems to be Solved by the Invention

In the imaging apparatus described in Patent Document 1, when a shutter button is pressed, an omnidirectional image at 360 degrees around the imaging apparatus can be captured. The captured omnidirectional image is subjected to image conversion according to a predetermined projection model, and the converted image is stored in a recording medium or the like in the apparatus as an image format illustrating a celestial sphere image.

The omnidirectional camera can perform imaging over a range of 360 degrees which is much wider than the range that can be normally seen by a user, and when such a super wide-angle image is captured, even after imaging is performed, the user can check and discover a subject or the like that the user has missed during imaging. Meanwhile, the user may want to know a distance to a subject of interest in the captured image. For example, when the user views the captured image later, the user can also know distances information, so that the user can more strongly recall the situation or impression during imaging.

By the way, there is known a time of flight (TOF)-type distance measurement sensor that optically measures a distance to an imaged subject in units of imaging pixel similar to the camera. Here, when the TOF-type distance measurement sensor is combined with the imaging apparatus described in Patent Document 1, in principle, the distance to the subject can be measured together with capturing an image of the subject. However, there are the following practical problems.

(1) The angle of view and the number of pixels of a general distance measurement sensor are smaller than the angle of view and the number of pixels (during wide-angle imaging) of a camera sensor, the general distance measurement sensor has difficulty in covering a subject omnidirectionally.

(2) The camera sensor and the distance measurement sensor are required to be arranged to not enter the fields of view of each other.

(3) The position coordinates of image data and distance data of the subject differ from each other depending on the installation positions of the camera sensor and the distance measurement sensor, and are required to correspond to each other.

The present invention has been made in light of the above problems, and an object of the present invention is to provide a camera apparatus capable of measuring a distance to a subject omnidirectionally while capturing an image of the subject omnidirectionally with high accuracy, and storing data of the image and the distance in correspondence therebetween.

Solutions to Problems

In order to solve the problems, the techniques described in the claims are used. As one of the techniques, there is provided a camera apparatus that captures an image of a surrounding subject and measures a distance to the subject, the apparatus including: two camera devices installed at positions that enable omnidirectional imaging from a viewpoint of the camera apparatus; and two distance measurement devices installed at positions that enable omnidirectional distance measurement from the viewpoint of the camera apparatus. Image data of each of pixel positions captured by the two camera devices and distance data of each of the pixel positions measured by the two distance measurement devices are stored in a memory in association with the pixel positions.

Effects of the Invention

According to the present invention, a distance to the subject can be omnidirectionally measured while an image of the subject is omnidirectionally captured with high accuracy, and data of the image and the distance can be stored in correspondence therebetween.

BRIEF DESCRIPTION OF THE DRAWINGS

FIG. 1A is a view illustrating the exterior of a camera apparatus of a first embodiment.

MODE FOR CARRYING OUT THE INVENTION

Figure 1B:
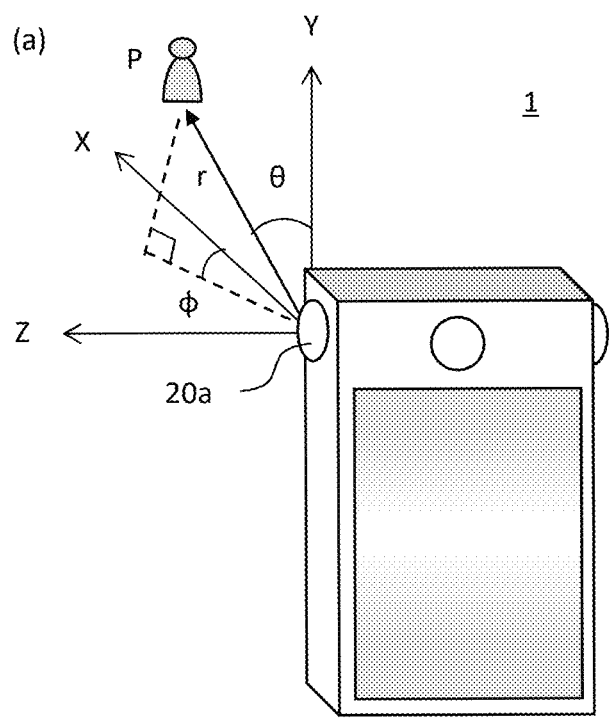
FIG. 1B is a view describing the azimuth coordinates of a subject when measured by the camera apparatus.
Figure 1B:
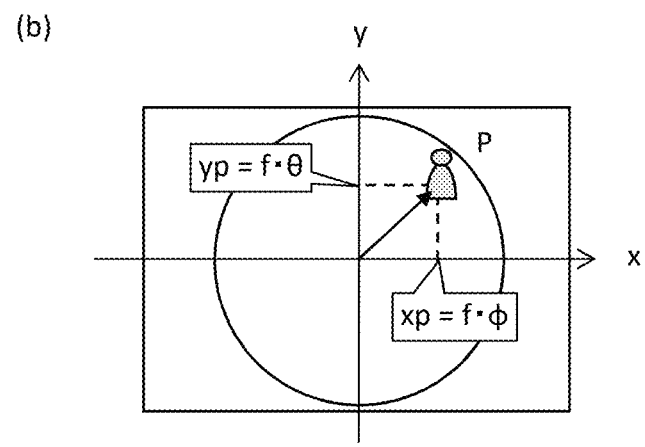

Hereinafter, embodiments of the present invention will be described with reference to the drawings.

First Embodiment

In a first embodiment, a method in which two camera devices and two distance measurement devices are used to capture an image at 360 degrees omnidirectionally and to measure a distance to a subject is illustrated.

FIG. 1A is a view illustrating the exterior of a camera apparatus 1 according to the first embodiment, (a) is a perspective view, and (b) is a plan view. Here, a case where the camera apparatus 1 has the shape of a smartphone or a tablet terminal is illustrated. Camera devices 10a and 10b for wide-angle imaging are installed on a front surface and a back surface of the camera apparatus 1, which are surfaces on which an in-camera and an out-camera are normally mounted. Here, 10a corresponds to an in-camera side, and 10b corresponds to an out-camera side. Due to using, for example, fish-eye lenses, the two camera devices 10a and 10b can capture an image of a subject at 360 degrees omnidirectionally, namely, in an upward and downward direction and a rightward and leftward direction around the camera apparatus 1. A display 42 which displays the captured image or the like is provided on a front surface side of the camera apparatus. The display 42 includes a built-in touch panel, and receives a touch operation by a user.

Further, distance measurement devices 20a and 20b which measure a distance to a subject are installed on right and left side surfaces of the camera apparatus 1. The distance measurement devices 20a and 20b emits a radio wave (light) of a predetermined wavelength, and receives a radio wave that is reflected by the subject to return thereto. Then, the distance measurement devices 20a and 20b are devices (TOF sensors) that measure the distance to the subject based on a time difference from an emission timing to a reception timing.

The distance measurement devices 20a and 20b have the same sensor structure as that of optical sensors of the camera devices 10a and 10b, and receive the reflected light from the subject, for example, with pixels arranged in a matrix pattern. At that time, for example, wide-angle optical lenses which refract a radio wave or light of the predetermined wavelength are used to receive the light in the same manner as the camera devices 10a and 10b. Namely, since each of the distance measurement devices 20a and 20b covers an azimuth of 180 degree, both can measure the distance to the subject at 360 degrees omnidirectionally in units of pixel of the sensor.

As described above, the two camera devices 10a and 10b are installed on surfaces that face each other with respect to a principal surface (for example, the front surface on which the display 42 is provided) of the camera apparatus 1, and the two distance measurement devices 20a and 20b are installed on surfaces that face each other with respect to a side surface orthogonal to the principal surface of the camera apparatus 1. With such an arrangement, the distance measurement devices 20a and 20b do not appear on the camera devices 10a and 10b, and the camera devices 10a and 10b can capture an image at 360 degrees omnidirectionally without a dead zone.

However, since the camera devices 10a and 10b and the distance measurement devices 20a and 20b are arranged at different positions orthogonal to each other on the camera apparatus 1, image data captured by the camera devices 10a and 10b and distance data measured by the distance measurement devices 20a and 20b have different coordinates on the sensors thereof for the same subject. Therefore, coordinate conversion to be described next is adopted to easily enable compatibility between both.

FIG. 1B is a view describing the azimuth coordinates of a subject when measured by the camera apparatus 1. (a) is a view describing a measurement coordinate system of the distance measurement devices 20a and 20b, and when a distance vector from the distance measurement device 20a to a subject P is r, the azimuth of the subject P is represented using two angles ($\theta$, $\phi$) by an angular coordinate system (polar coordinate). In this example, the angles are with respect to a rightward and leftward direction (X-axis) and an upward and downward direction (Y-axis) orthogonal to a central axis direction (Z-axis) of the distance measurement device 20a. Then, the angle $\theta$ is a deviation angle from the Y-axis, and the angle $\phi$ is a deviation angle from the X-axis. The azimuth coordinates of the subject P represented by the angular coordinate system are converted into a matrix coordinate system of a sensor surface of each of the distance measurement devices 20a and 20b.

(b) is a view illustrating the matrix coordinate system of the sensor surface of the distance measurement device. The azimuth of the subject P represented by the angular coordinate system ($\theta$, $\phi$) can be expressed by the relationship of $xp = f \cdot \phi$ and $yp = f \cdot \theta$ with the position ($xp$, $yp$) of the subject P in the matrix coordinate system (x, y). Here, a coefficient f is the focal distance of the fish-eye lens to be described later in FIG. 5.

Meanwhile, similarly, the position coordinates of the subject P which is imaged by the camera devices 10a and 10b can be also described with respect to the central axis of each of the camera devices in the angular coordinate system ($\theta'$, $\phi'$). However, regarding the coordinates on the sensors acquired by the distance measurement devices 20a and 20b, in order to cause the angle $\phi$ to deviate by 90 degrees in the rightward and leftward direction, 90 degrees is added to the angle $\phi$ ($\phi' = \phi + 90$), so that coordinates on the sensor surface of the distance measurement device are associated with coordinates on the sensor surface of the camera device.

Figure 1C:
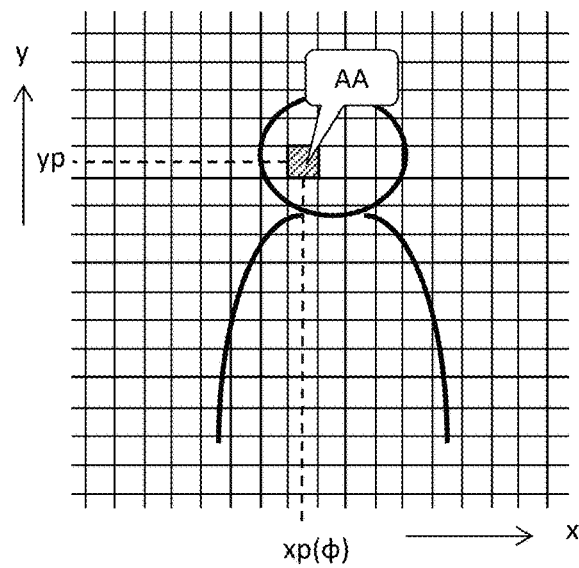
FIG. 1C is a view illustrating pixel matrix arrays of sensor surfaces.
Figure 1C:
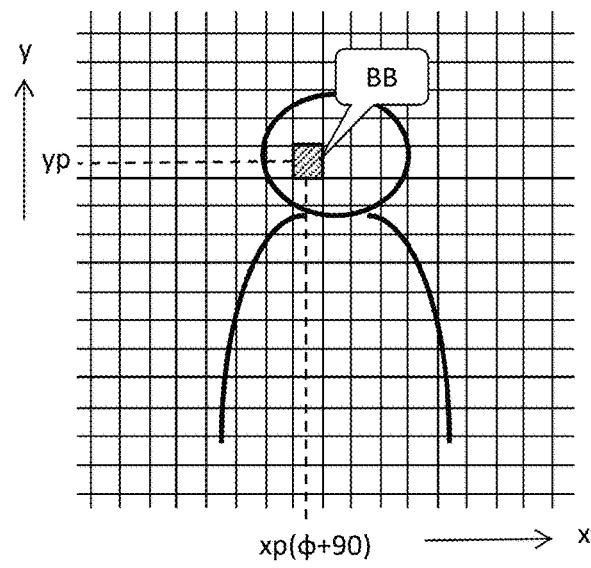

FIG. 1C is a view illustrating pixel matrix arrays of the sensor surfaces. (a) illustrates a camera device side and (b) illustrates a distance measurement device side. Here, the pixels of both are arranged at the same intervals. Regarding the x-axis coordinate (xp), an angle of 90 degrees is added (φ+90), so that the coordinates on the sensor surface of the camera device are associated with the coordinates on the sensor surface of the distance measurement device. On the sensor surface of the camera device of (a), a received light signal of each part of a subject is converted into luminance and color difference information to be acquired in units of pixel. On the sensor surface of the distance measurement device of (b), a radio wave (light) signal from each part on the subject is converted into distance information to be acquired in units of pixel. As a result, the luminance and color difference information and the distance information of the same part of the subject can be stored at the same position coordinates (xp, yp).

Figure 2:
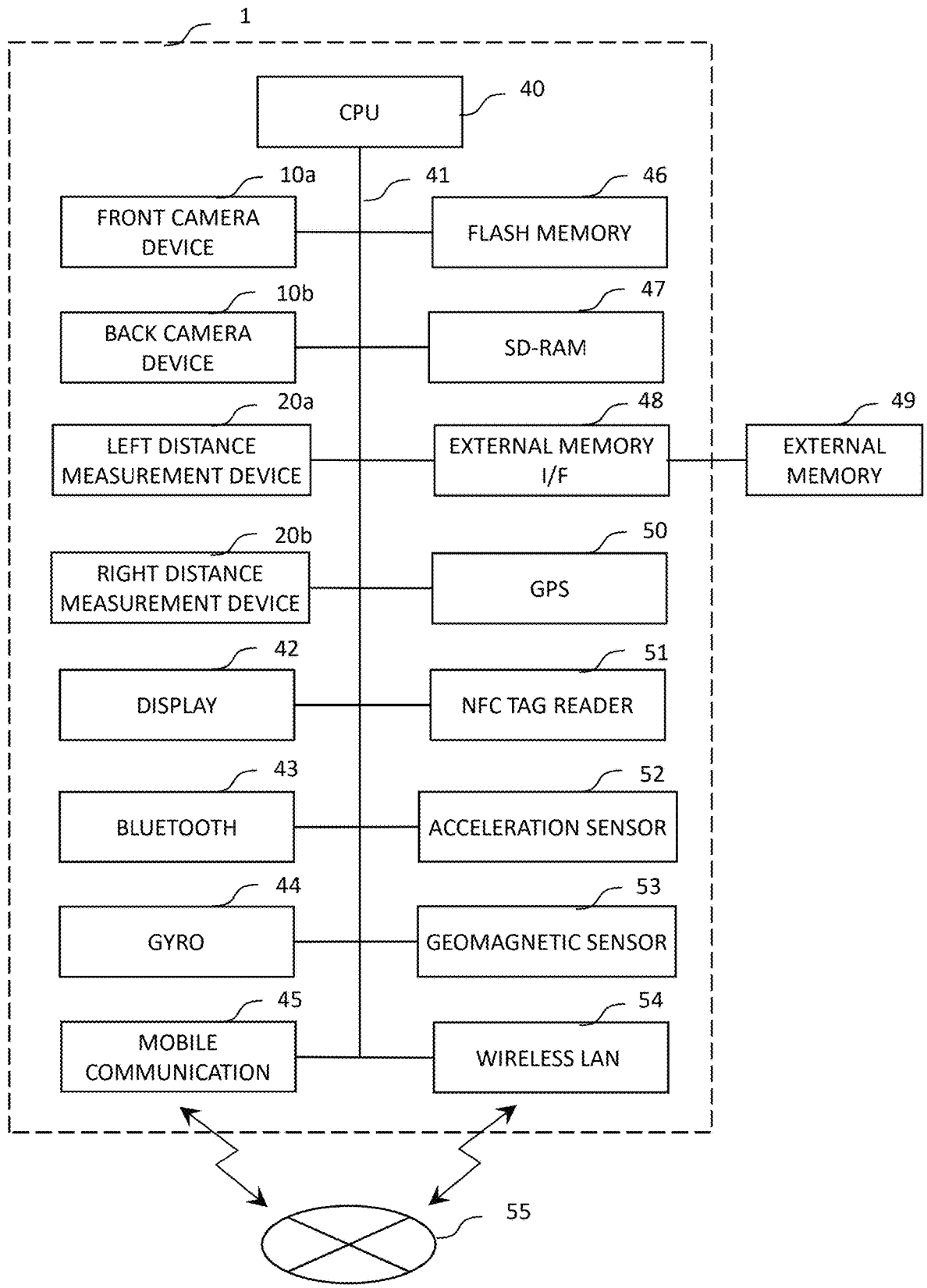
FIG. 2 is a block diagram illustrating an internal configuration of the camera apparatus.

FIG. 2 is a block diagram illustrating an internal configuration of the camera apparatus 1. The entirety of the camera apparatus 1 is controlled by a program running on a CPU 40. A bus 41 extends from the CPU 40 to be connected to the following hardware controlled by the CPU 40.

The front camera device 10a and the back camera device 10b are illustrated in FIG. 1A, and capture an image of a subject at 360 degrees all around the camera apparatus 1 to output digital information of image data by using the matrix coordinate system of the sensor illustrated in FIG. 1C(a). The distance measurement device 20a on the left side and the distance measurement device 20b on the right side are illustrated in FIG. 1A, and acquire a distance to the subject at 360 degrees all around the camera apparatus 1 in units of pixel to output digital information of distance data by using the matrix coordinate system of the sensor illustrated in FIG. 1C(b). The display 42 displays the image captured by the camera devices 10a and 10b or the distance information acquired by the distance measurement devices 20a and 20b.

The camera apparatus 1 has the following other functions. A Bluetooth (registered trademark) 43 performs short-range wireless communication with a smartphone, a tablet terminal, a personal computer, or the like nearby. A gyro 44 detects the amount of a change in directional relationship between the subject and the camera apparatus, which is caused by a change in posture of the camera apparatus 1 in the upward and downward direction, the rightward and leftward direction, and a rotation direction. A mobile communication 45 is connected to an Internet 55 by using a communication network mounted in a smartphone, a tablet terminal, a personal computer, or the like.

A flash memory 46 serves as a storage that stores data such as compression parameters, which are optimal for the mounted fish-eye lens and are used to compress captured image data, in addition to storing software running on the CPU 40 or constants. An SD-RAM 47 is a memory capable of performing a high-speed Read/Write process for use in a work area for an information input and output process by the software running on the CPU 40. An external memory I/F 48 is an interface through which an external memory 49 which is detachable stores image data captured by or distance data measured by the camera apparatus 1, data downloaded from the Internet 55, or the like. Naturally, the image data captured by or the distance data acquired by the camera apparatus 1 can be also stored in an internal memory not illustrated.

A global positioning system (GPS) 50 measures the current position of the camera apparatus 1. An NFC tag reader 51 is used to associate the camera apparatus with a smartphone when connection between the camera apparatus 1 and an information device such as a smartphone is set. An acceleration sensor 52 measures acceleration so as to calculate the movement distance (=double integrated value of acceleration) and the moving speed (=integrated value of acceleration) of the camera apparatus 1. A geomagnetic sensor 53 measures the azimuth of the camera apparatus 1 on the map. Similar to the mobile communication 45, a wireless LAN 54 is connected to the Internet 55 via a public Wi-Fi station.

Incidentally, the Bluetooth 43, the mobile communication 45, the NFC tag reader 51, and the wireless LAN 54 can be also used to measure the current position of the camera apparatus 1. The above components are configured to be connected to the bus 41 and to be controlled to perform various operations by the control software running on the CPU 40.

Figure 3A:
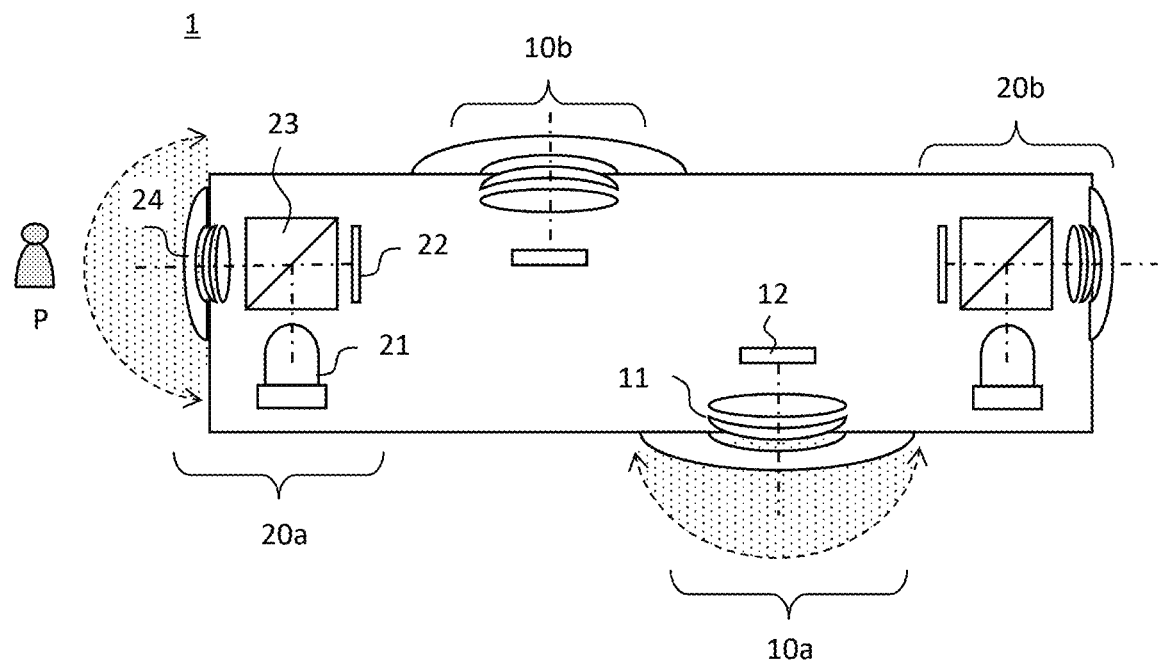
FIG. 3A is a view illustrating a specific structure of camera devices and distance measurement devices.
Figure 3B:
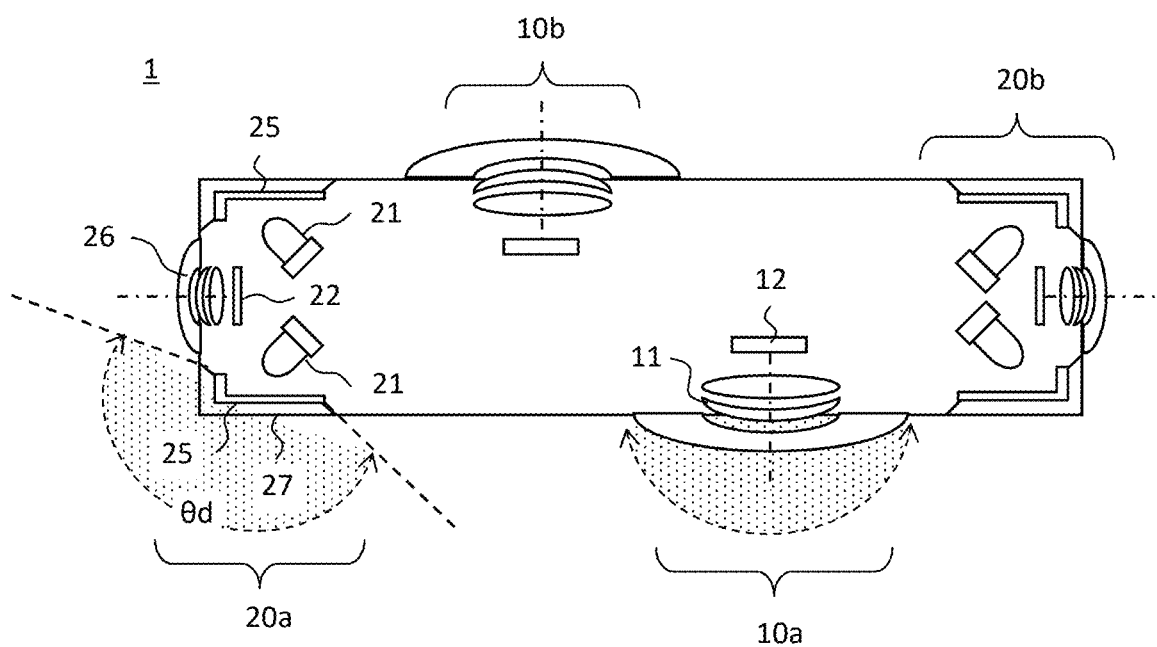
FIG. 3B is a view illustrating a specific structure of camera devices and distance measurement devices.

FIGS. 3A and 3B are plan views illustrating specific structures of the camera devices and the distance measurement devices installed in the camera apparatus 1. Here, two examples are illustrated, the camera devices have the same structure, and the distance measurement devices have different structures. In FIGS. 3A and 3B, the two camera devices 10a and 10b are provided on a front surface side and a back surface side (upper and lower surfaces in the figures) of the camera apparatus 1. Each of the camera devices takes in light from a subject at an angle of view of 180 degrees or more with a fish-eye lens 11 to generate an image signal of the subject with a sensor 12. The images captured by the two camera devices 10a and 10b are combined to acquire a 360-degree omnidirectional image. The two distance measurement devices 20a and 20b are provided on the right and left side surfaces of the camera apparatus 1, and the distance measurement devices also measure a distance to the subject P at an angle of view of 180 degrees or more.

In each of the distance measurement devices 20a and 20b of FIG. 3A, a transmitter 21 and a receiver 22 are disposed to be coaxial with each other by using a half mirror prism 23. A signal of a predetermined wavelength transmitted from the transmitter 21 is diffused at an angle of 180 degrees or more by a lens 24 that refracts a signal in the same manner as the fish-eye lens. A part of the signal reaches the subject P, and the reflected signal is input to a predetermined sensor pixel of the receiver 22 by the lens 24. Each of the pixels of the receiver 22 calculates the distance to the subject P.

Each of the distance measurement devices 20a and 20b in FIG. 3B is configured such that not the lens but a diffusion panel 25 projects a signal, which is transmitted from the transmitter 21, at a wide angle. The diffusion panel 25 is a member such as a translucent white panel as an example in the case of visible light, and is a member that diffuses light in a random direction. Here, it is desirable that the diffusion panel 25 is installed slightly inside a casing surface 27 of the camera apparatus 1. As a result, the transmitted signal is diffused in the range of a diffusion angle θd, but since a receiving lens 26 is out of the range, the transmitted signal can be avoided from being directly incident on the receiver 22. In this case, the diffusion angle θd is an angle of 180 degrees or less, but since the diffusion panels 25 are installed, for example, at four corners of the camera apparatus 1, the signal can be transmitted at 360 degrees omnidirectionally. Simultaneously, since the signal does not directly enter the receiver 22, a state where S/N is decreased, such as a backlight condition referred to in an optical camera, can be structurally avoided.

Next, the arrangement and structure of the camera devices, which causes the camera apparatus to perform imaging over a wider range and to secure the resolution, will be described. In a general camera apparatus, the angle of view at which imaging can be performed using one camera device is an angle of view of approximately 180 degrees at maximum. There is a fish-eye lens that performs imaging at an angle of view of over 200 degrees, but even when imaging is performed at a very wide angle of view at once, if the number of pixels of a sensor is small, a sufficient resolution may not be obtained when the images are cut. Therefore, it is necessary to configure the camera device such that the angle of view and the number of pixels of the sensor can be selected in a well-balanced manner to secure a desired resolution while having a wide angle of view.

Further, it is desirable that the camera devices are more efficiently installed in consideration of the outer shape of the camera apparatus and a usage pattern of a user. In the example illustrated in FIG. 1A, the two camera devices 10a and 10b are installed on the front surface side and the back surface side of the camera apparatus; however, the following modified arrangements are also possible.

Figure 4A:
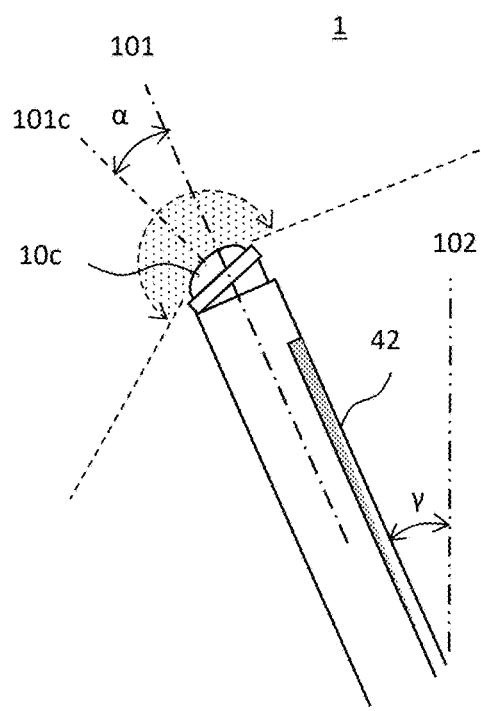
FIG. 4A is a view illustrating a modification example of the installation position of a camera device.
Figure 4B:
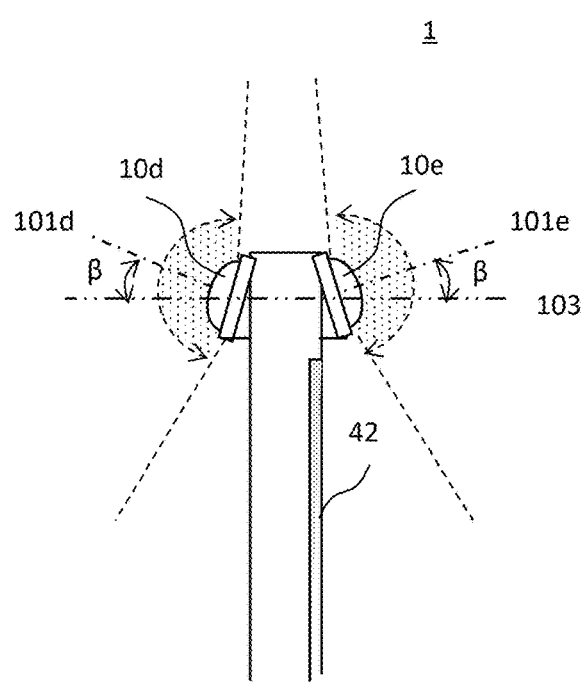
FIG. 4B is a view illustrating a modification example of the installation positions of camera devices.

FIGS. 4A and 4B are views illustrating the installation of camera devices, which takes into consideration a usage pattern of a user. FIG. 4A is a side view illustrating a first modification example of the installation position of a camera device, and illustrates a case where one camera device 10c having a wide angle of view is provided on an upper surface of the camera apparatus 1. Here, the camera device 10c is installed such that a central axis 101c of the camera device 10c is inclined to the back surface side (side opposite to the display 42) of the camera apparatus by α with respect to a central axis 101 of the camera apparatus 1. As a result, an image of a subject over a wide range can be captured by the single camera device 10c, which can be said to be practical. The reason will be described.

Generally, when a user uses a mobile terminal such as the camera apparatus 1, the posture of the camera apparatus 1 is held in a state where the camera apparatus 1 is inclined by an angle γ from a vertical direction 102 facing the user with the display 42 facing upward. Even when imaging is performed by a lens (fish-eye lens) having a wide angle of view, there is a high possibility that a predominant subject is mainly located in an upward and downward range in front of the user as seen from the user. If the direction of the central axis 101c of the camera device 10c coincides with the direction of the central axis 101 of the camera apparatus 1, the angle of view of the camera device 10c faces slightly upward, and there is a possibility that a lower part of the predominant subject is out of an effective imaging region. Therefore, in order to increase a front lower imaging region, the central axis 101c of the camera device 10c is inclined by α in a forward direction. Since the camera device 10c is installed in such a posture, even when one camera device having a wide angle of view of 180 degrees is used, an image of a subject over a wide range can be efficiently captured.

FIG. 4B is a side view illustrating a second modification example of the installation position of a camera device, and illustrates a case where two camera devices 10d and 10e are used to secure both of the angle of view and the resolution. The camera devices 10d and 10e having wide angles of view are installed on both surfaces of the camera apparatus 1. Here, both of the angles of view may be an angle of view of 180 degrees or less. Then, the two camera devices 10d and 10e are installed such that central axes 101d and 101e of the camera devices 10d and 10e are inclined upward by an angle β with respect to a horizontal direction 103 as seen from the user (vertical axis direction of the camera apparatus 1). As a result, even when the camera devices 10d and 10e have an angle of view of 180 degrees or less, imaging regions of the two camera devices are combined to mutually cover blind spots of the cameras; and thereby, an image over a wide range can be obtained. In addition, the configuration where the camera devices are installed as in this case can be also applied to a general omnidirectional camera having an angle of view close to 360 degrees.

Incidentally, in the configurations of FIGS. 4A and 4B, the positional relationship between the camera device and the distance measurement device deviates from the state of FIG. 1A by the angles α and β. Therefore, regarding the matrix coordinates on the sensor surface illustrated in FIG. 1C, a correction is performed to cause the coordinates to deviate by the angles α and β.

Figure 5:
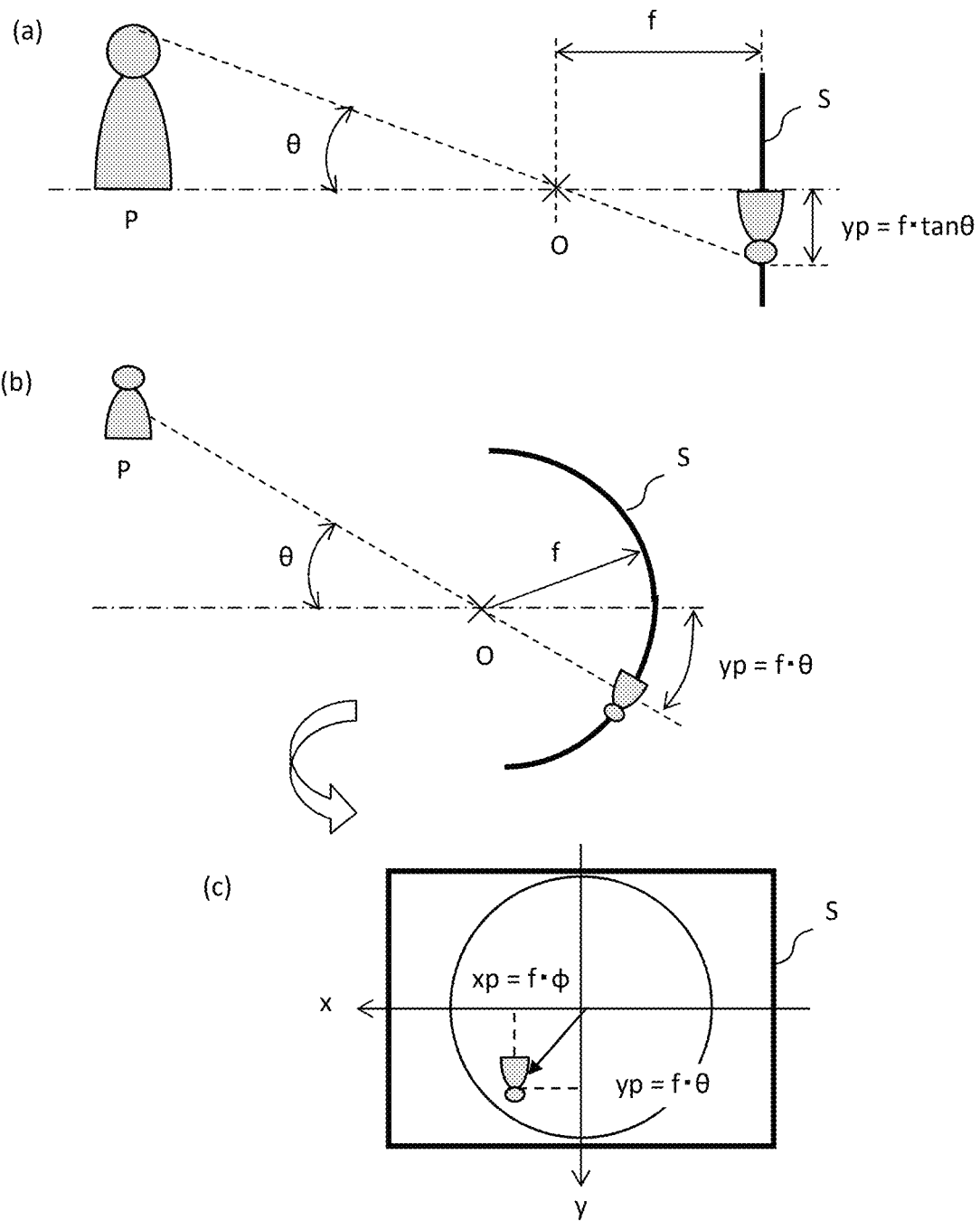
FIG. 5 is a view describing an optical system of an omnidirectional camera device.

FIG. 5 is a view describing an optical system of an omnidirectional camera device. (a) illustrates an optical system of a general camera for comparison, and (b) and (c) illustrate an optical system using a fish-eye lens.

(a) illustrates the optical system of the general camera as the camera is seen from the side. The center position of a lens is represented by a principal point O. A camera sensor S (or film) having a planar shape is arranged at a position that is at a distance f from here. When an optical lens is used, f is the value of the focal distance of the lens. In this case, light from all the parts of the subject P passes through the principal point O to be incident on the camera sensor S. The same applies to when an optical lens having a predetermined aperture is used or when a pinhole lens (lens produced by providing a hole having a diameter as close to zero as possible in a thin paper) is used.

When imaging is performed using the optical system in a state where a lower end of the subject P is aligned with the optical axis of the lens, light from an upper end point of the subject P passes through the principal point O of the lens at an angle of view θ to be incident on the point of a position yp on the camera sensor S. At that time, the position of incidence is yp=f·tan θ.

A maximum angle of view θmax at which imaging can be performed by the optical system depends on a focal distance f and the magnitude of the camera sensor. For example, in order to bring the maximum angle of view θmax close to 90 degrees, the focal distance f should be made as small as possible, or the camera sensor S should be made as large as possible. The practical value of the maximum angle of view θmax in this method is approximately 50 degrees at maximum, and is up to approximately 100 degrees in total. Therefore, it is difficult to apply the optical system to a camera device having an angle of view of 180 degrees.

(b) illustrates the case of the optical system using a fish-eye lens. As described in (a), since it is difficult to perform imaging at a wide angle of 180 degrees in the configuration of the camera sensor S having a planar shape, a fish-eye lens in which the camera sensor S is formed in a spherical shape is applied. As the lens configuration, such as a fish-eye lens, where imaging is performed at a super wide angle, there are methods such as an equidistant projection method and a three-dimensional projection method, and here, the case of the equidistant projection method which is the most common is illustrated.

In this configuration, the focal distance is a radius f of a spherical surface, the angle of view θ is ±90 degrees around the optical axis, and light from the subject P in a range of up to 180 degrees in total passes through the principal point O to be incident on the camera sensor S having a spherical shape. As a result, for example, light from an upper end of the subject P passes through the principal point O of the lens at the angle of view θ to be incident on the position yp from the optical axis of the lens. At that time, the position of incidence on the camera sensor is yp=f·θ.

The figure is a view of the camera as seen in a horizontal direction (x-axis direction), and the subject P located in a vertical direction (y-axis direction) is incident at the angle of view θ to be imaged at the position yp on the camera sensor. Similarly, in a case where the camera is seen in an upward direction (y-axis direction), when a subject located in the horizontal direction (x-axis direction) is incident at an angle of view φ, the subject is imaged at a position xp on the camera sensor. Therefore, a relationship (xp, yp) between the angles of incidence (φ, θ) of both and the imaging coordinates on the camera sensor can be expressed by (f·φ, f·θ).

However, the camera sensor S is actually not configured as a spherical surface as in (b) but configured as a plane as in (a). For this reason, there is also known a configuration where the camera sensor having a planar structure illustrated in (a) is used to implement the optical configuration of the fish-eye lens of (b). As a result, a spherical coordinate system on the camera sensor is transformed into a planar coordinate system with respect to the distances (xp, yp) from the optical axes at the center.

(c) illustrates a two-dimensional coordinate system defined by the x-axis and the y-axis on the plane of the camera sensor, and the angle of incidence from the subject can be specified from the coordinates. Namely, the light incident from the subject at the angles (θ, φ) is incident on the coordinates (xp, yp), which are calculated by the above equation, in the x-axis and y-axis coordinate system on the camera sensor having a planar shape illustrated in (c).

Not only the optical system illustrated in (b) and (c) can be used in the camera device which performs imaging at a wide angle of 180 degrees or more in the present embodiment, but also the optical system can be used when a signal which has a wavelength equivalent to that of light and is deflectable by the optical lens is used. Namely, the optical system can be also applied to the optical system of the distance measurement device in the present embodiment.

Figure 6A:
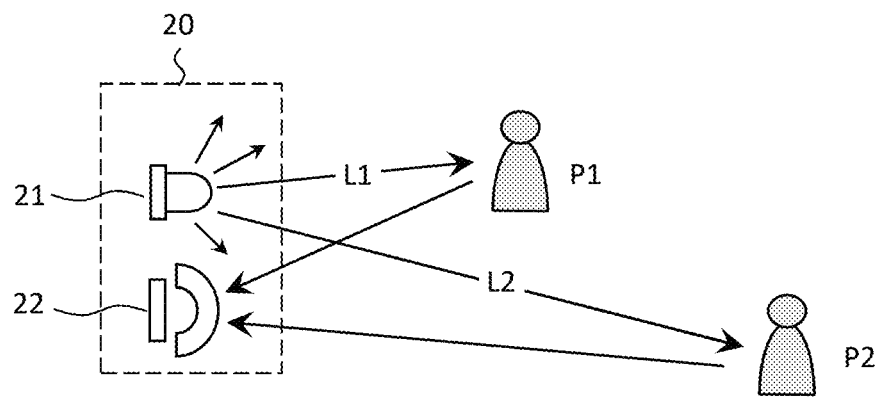
FIG. 6A is a view describing a distance measurement method by a distance measurement device.
Figure 6B:
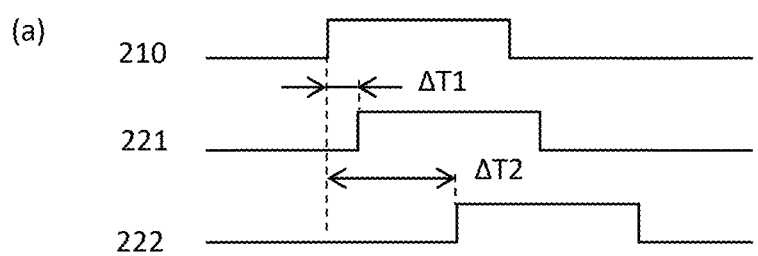
FIG. 6B is a view describing signal waveforms and distance calculation methods.
Figure 6B:
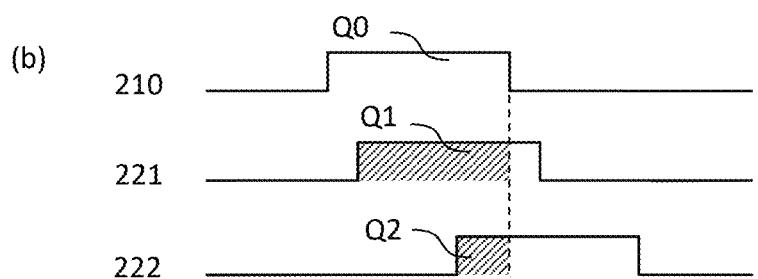
Figure 6B:
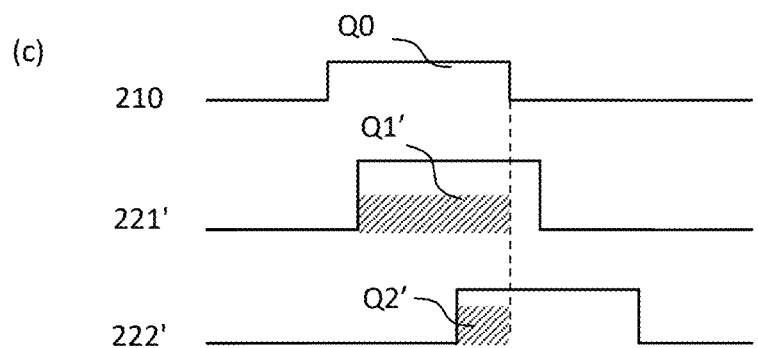

FIGS. 6A and 6B are views describing a distance measurement method by a distance measurement device. A distance measurement device 20 includes the transmitter 21 and the receiver 22, and the measurement of distances to two subjects P1 and P2 having different distances will be described.

In FIG. 6A, the transmitter 21 transmits a signal of a predetermined frequency from infrared light to a terahertz band. The signal output from the transmitter 21 reaches the subject P1 at a short distance L1, and reflected signal is received by the receiver 22. The same applies to the subject P2 at a long distance L2, and reflected signal is received by the receiver 22. Here, as the signal used in the distance measurement device, a signal of a wavelength, which naturally exists in the surrounding environment including the subject to be measured and which has a small level and does not affect the level of a received signal when the signal is transmitted from the distance measurement device and the reflected signal from the subject is received, is used.

A sensor surface of the receiver 22 includes pixels in a matrix pattern as illustrated in FIG. 1C(b), and is set such that a signal incident from each direction is incident on a predetermined pixel. For this reason, for example, the signal is deflected in a predetermined direction by an optical lens, and similar to the fish-eye lens having an angle of view of 180 degrees or more, the signal from a wide angle range is received. As a result, the signals from the two subjects P1 and P2 in different directions are incident on different pixels of the sensor surface. Therefore, the signal emitted from the transmitter 21 propagates by a distance L1×2 in the case of the subject P1 and by a distance L2×2 in the case of the subject P2 to be received by pixels of the receiver 22, the pixels corresponding to the azimuths of the subjects.

FIG. 6B is a view describing signal waveforms and distance calculation methods. A signal waveform output from the transmitter 21 and signal waveforms which are reflected from the two subjects P1 and P2 to be received by the receiver 22 are illustrated. The waveforms can be compared to each other to calculate the distances to the subjects. Hereinafter, three methods for calculating a distance from a received signal waveform will be described.

(a) illustrates a method for calculating a distance from a time difference between signal waveforms. When an output signal of the transmitter 21 is output in a pulse waveform having a predetermined time width as illustrated by 210, the receiver 22 receives a waveform which is reflected by a subject to return thereto with delay of the round trip time to the subject with respect to the output waveform. In the case of the subject P1 at a short distance, a received waveform is as illustrated by 221, and in the case of the subject P2 at a long distance, a received waveform is as illustrated by 222. The received waveforms are received with delay times of ΔT1 and ΔT2. Since the signal transmitted from the transmitter 21 propagates at a light speed C (≈300,000 km/sec), the distances L1 and L2 to the subjects P1 and P2 are obtained by L1=C×ΔT1/2 and L2=C×ΔT2/2. In this case, since the accuracy of distance measurement depends on how accurately the delay time ΔT can be measured, a high-speed clock is required to be driven to perform counting for highly accurate distance measurement.

(b) illustrates an example of a method for integrating signal waveforms to calculate a distance from a power conversion value. The logical products (areas of shaded parts) of a pulse waveform 210 of a transmitted signal and pulse waveforms 221 and 222 of received signals can be calculated to acquire the amounts of delay of the received signal as a power value Q. The magnitude of the power value Q corresponds to the distance. A large power value Q1 is obtained from the subject P1 at a short distance, and a small power value Q2 is obtained from the subject P2 at a long distance. The distance values L1 and L2 can be calculated by L1=k(Q0−Q1) and L2=k(Q0−Q2) using differences between a power value Q0 set in advance of the pulse waveform 210 transmitted and the power values Q1 and Q2, and a proportional coefficient k indicating a relationship between the distance and the received power. In the case of this method, when the subjects have the same reflection coefficient, the relationship between the distance and the received power is linear, so that the distance can be accurately measured.

(c) illustrates a method for calculating a distance from a power conversion value in the same manner as in (b), and corresponds to a case where the subjects have different reflection coefficients. The peak level (amplitude value) of a received signal depends on the reflection coefficient of a subject, for example, the peak level of a received signal 221' from the subject P1 is high, and the peak level of a received signal 222' from the subject P2 is low. Therefore, when power values are obtained by integrating the received signals they are, a difference between the reflection coefficients becomes a measurement error. Therefore, a determination on the period of presence or absence of the received signal is sufficient to enable measuring the distance to the subject, and thus information of the peak level of the received signal is not used. Namely, only the information of lower bits (areas of shaded parts) in data obtained by A/D converting the received signals is used to acquire power values Q1' and Q2'. Then, the distances are calculated in the same manner as in (b). Accordingly, even when the maximum levels of the received signals fluctuate due to the difference between the reflection coefficients of the subjects or the like, the distances corresponding to the delay times can be accurately measured.

Figure 7:
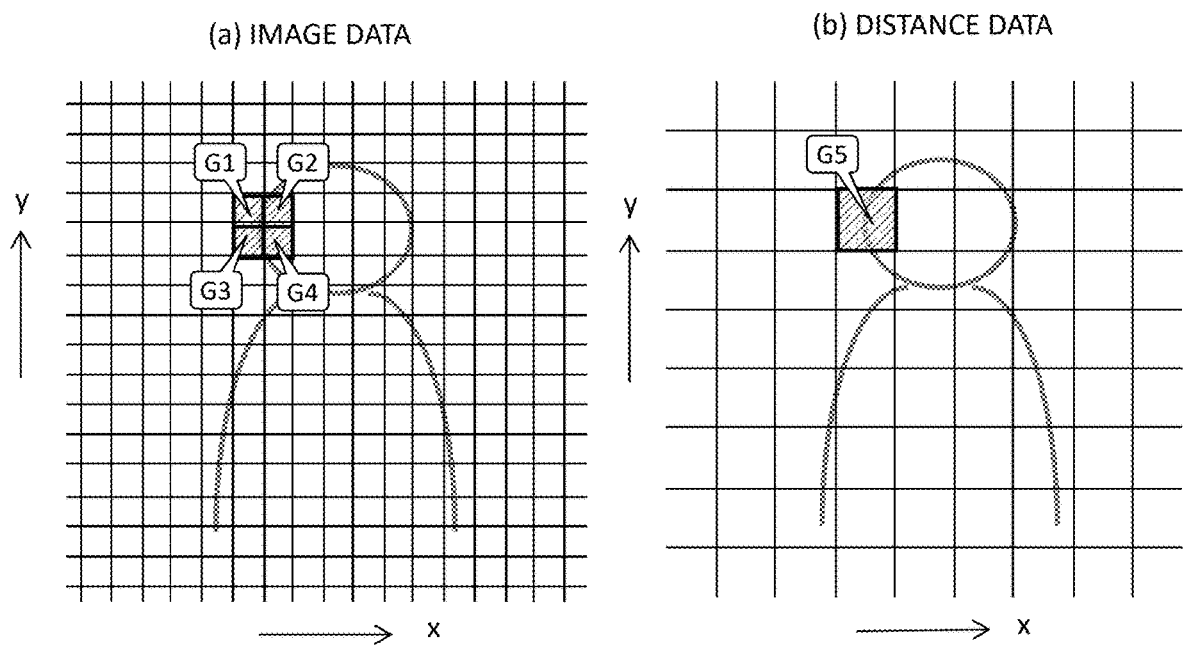
FIG. 7 is a view illustrating correspondence between the pixels of image data and distance data which are to be stored.

FIG. 7 is a view illustrating correspondence between the pixels of image data and distance data which are to be stored. (a) illustrates image data captured by the camera device. The pixels store data as many as the number of horizontal pixels×the number of vertical pixels in a vertical and horizontal two-dimensional matrix pattern. Each of the pixels has data of a predetermined bit width (for example, U and V=4 bits whereas Y=8 bits) for each of luminance and color difference signals (Y, U, and V).

(b) illustrates distance data to a subject measured by the distance measurement device. In this example, one pixel G5 corresponds to four pixels G1 to G4 adjacent to each other in the image data of (a). Namely, one distance data of (b) corresponds to four image data of (a), and the number of the distance data is ¼ of the number of the image data.

In this case, naturally, the number of the distance data (the number of pixels) may be the same as the number of the image data (the number of pixels); however, even when the numbers of data of both differ from each other, there is no practical problem. The reason is that when image data and distance data of the same number of pixels are individually acquired by different optical systems orthogonal to each other at 90 degrees, it is difficult to cause the distance data and the image data to coincide with each other on a pixel by pixel basis due to limitation to the accuracy of the axis of the camera device and the resolution of the distance measurement device. In addition, when it is desired to know the distance in units of subject (object), the distance data is acceptable even if the resolution in the subject is slightly low. Therefore, the number of the image data taking precedence over the distance data is increased and the number of the distance data is decreased within the range where the positional relationship between the distance data and the image data can be secured.

Figure 8A:
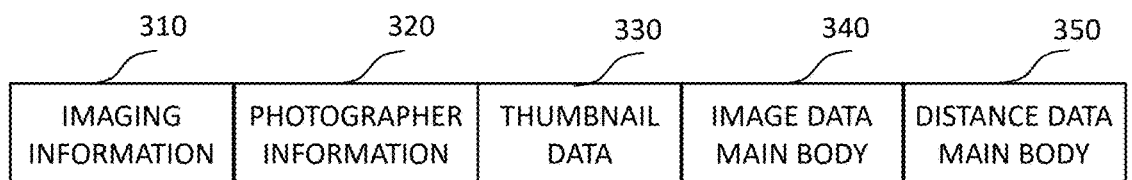
FIG. 8A is a diagram illustrating a format of a data file to be stored.

FIG. 8A is a diagram illustrating a format of a data file to be stored. A data file 300 is largely made up of five parts. The data file 300 includes imaging information 310 indicating states when imaging is performed by the camera apparatus, photographer information 320 indicating personal information of a photographer or the owner of the camera apparatus, thumbnail data 330 that can be used as a thumbnail in a reduced image of image data, an image data main body 340, and a distance data main body 350. Here, the thumbnail data 330 and the image data main body 340 contain an image size (the numbers of vertical and horizontal pixels), an encoding method, information required for decoding, and the like.

The imaging information 310 describes imaging date and time, file storage date and time, a camera name, a lens name, a shutter speed, an aperture value, a film mode, an ISO sensitivity, imaging location coordinates, the approximate location name of an imaging location, and the like. The file storage date and time is, for example, the time when image data is subjected to a required process (generally speaking, a developing process or the like) in the camera apparatus, in a mobile terminal, or in a PC, and the result is stored. The film mode indicates a type such as operation modes having different color reproduction characteristics such as color negatives or color slides, or a special processing mode such as black and white or a sepia color. The imaging location coordinates are coordinates represented by the values of the longitude and the latitude of an imaging location caught by the GPS 50.

In the image data main body 340, luminance and color difference information of each pixel is stored, for example, as a file in a format called JPEG. In the distance data main body 350, distance data of each pixel is stored as a file having the same file name as that of the JPEG file of the luminance and color difference information and having a different extension. As a result, the correspondence between the image data and the distance data is facilitated. Alternatively, the distance data main body 350 and the image data main body 340 may be stored as a common file in a new format with the distance data main body 350 added to a latter half part of the image data main body 340.

Incidentally, in the distance data main body 350, data for the pixels may be arranged in order and stored as it is, and there is a correlation in distance to each part of the subject between the pixels adjacent to each other in spatial arrangement. Therefore, similar to the image data main body 340, the distance data main body 350 may be compressed by the JPEG method using discrete cosine transform and Huffman coding, to be stored.

Figure 8B:
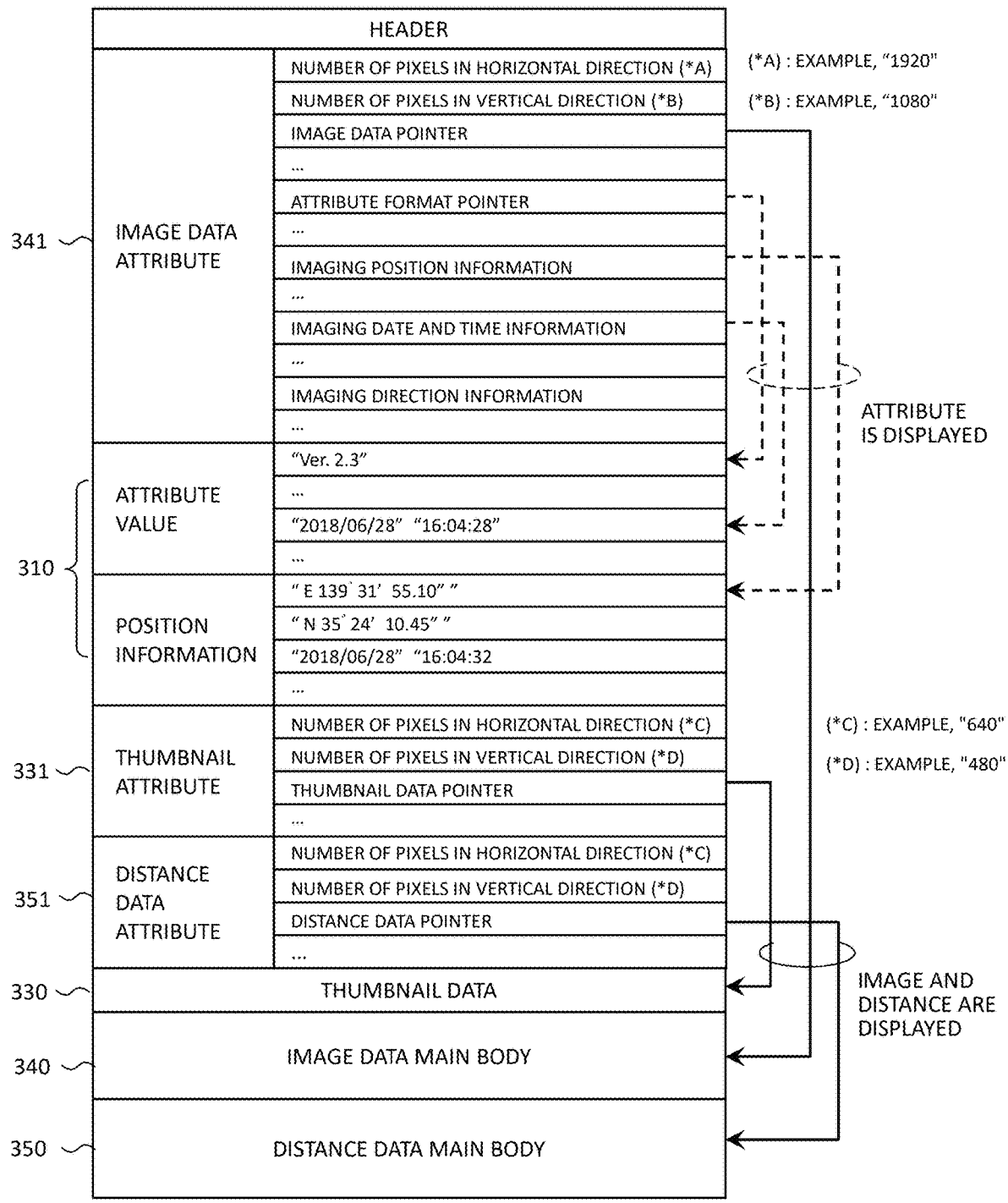
FIG. 8B is a diagram describing a method for searching a data file.

FIG. 8B is a diagram describing a method for searching a data file. Here, a configuration of the data file 300 is illustrated in detail and includes, as items, a header, an image data attribute 341, the imaging information (attribute value, position information, and the like) 310, a thumbnail attribute 331, a distance data attribute 351, the thumbnail data 330, the image data main body 340, and the distance data main body 350.

The image data main body 340 is described in a format where 8 bits data of Y, U, and V values is arranged in point order for the pixels of which the number is the number of the pixels in the horizontal direction×the number of the pixels in the vertical direction (for example, 1920×1080) described in the image data attribute 341. Similarly, the distance data main body 350 is described in a format where 8 bits data of distance values is arranged in point order for the pixels of which the number is the number of the pixels in the horizontal direction×the number of the pixels in the vertical direction (for example, 640×480) described in the distance data attribute 351.

In the image data attribute 341, the distance data attribute 351, and the thumbnail attribute 331, address pointers for searching information of each data or attribute values are described. When an image data pointer is selected, a desired image is extracted from the image data main body 340 to be displayed. When a distance data pointer is selected, a desired distance value is read from the distance data main body 350 to be displayed. At this time, when the same addresses are specified, the image of and the distance to the same subject can be displayed in correspondence therebetween. In addition, when an attribute format pointer is selected, the value of an attribute format version (Ver. 2.3) is displayed. In addition, imaging position information or imaging date and time information can be also displayed in the same manner.

Figure 9:
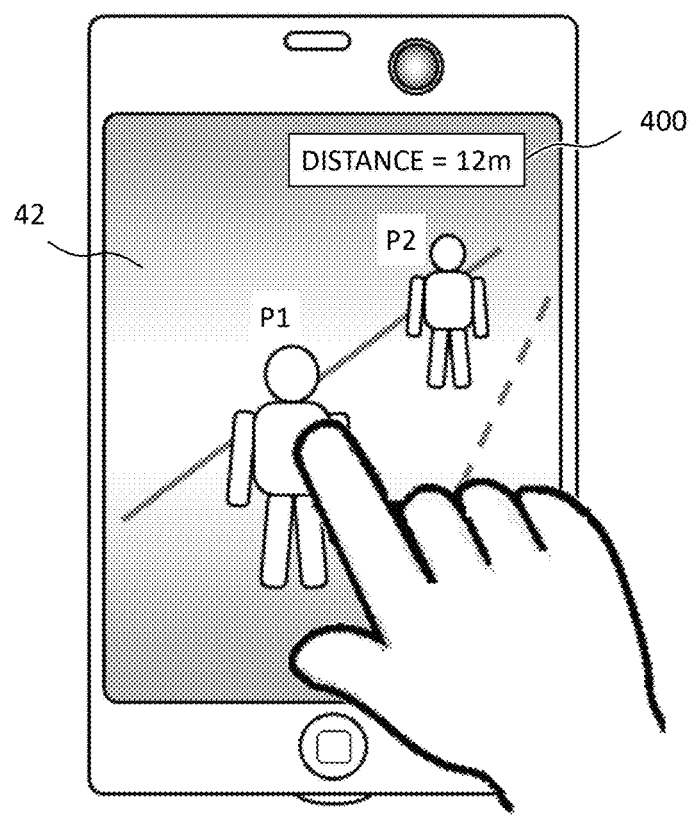
FIG. 9 is a view illustrating a display example of searched data.

FIG. 9 is a view illustrating a display example of searched data. An image specified by a user is displayed on the display 42 of the camera apparatus 1. Then, when the user touches the subject P1 on a screen with the finger, a distance to the subject P1 during imaging is displayed as illustrated by reference number 400. In the present embodiment, position information of the subject is stored in three-dimensional coordinates. Therefore, when the user specifies the two subjects P1 and P2, a distances between the two subjects P1 and P2 can be also displayed. As a result, when the user views the captured image later, the user can know the distances to the subjects, so that the user can more strongly recall the situation or impression during imaging.

According to the first embodiment, a distance to the subject can be omnidirectionally measured while an image of the subject is omnidirectionally captured with high accuracy, and data of the image and the distance can be stored in correspondence therebetween.

Second Embodiment

In a second embodiment, a method in which four camera devices are used to capture an image at 360 degree omnidirectionally and to measure a distance to a subject is illustrated. This method is suitable when four camera devices are installed in an eyeglass-type casing and a user wears the eyeglass-type casing on the head for use.

Figure 10A:
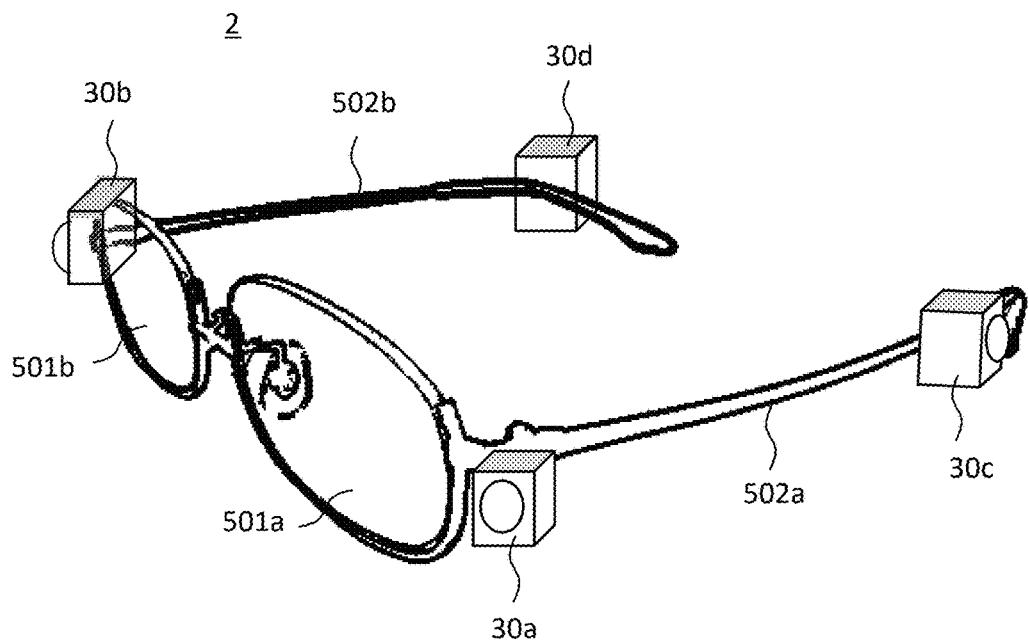
FIG. 10A is a view illustrating the exterior of an eyeglass-type camera apparatus of a second embodiment.

FIG. 10A is a perspective view illustrating the exterior of an eyeglass-type camera apparatus 2 according to the second embodiment. A total of four camera devices 30a to 30d are installed on both sides of front lenses 501a and 501b and at rear ends of temples 502a and 502b. The imaging direction of each of the camera devices 30a to 30d is a diagonal direction of a quadrilateral having the installation position as an apex.

When the imaging range of each of the camera devices is 180 degrees or more in an upward and downward (vertical) direction and 90 degrees or more (may be 180 degrees or less) in a rightward and leftward (horizontal) direction, imaging can be performed at 360 degrees omnidirectionally. In this case, since images of a surrounding subject can be simultaneously captured by two camera devices, a distance to the subject can be calculated using an interval between the two camera devices as a baseline length. A distance measurement method by a so-called stereo camera is adopted. Distance information of the subject measured at 360 degrees omnidirectionally can be calculated in units of pixel by this method, similar to the first embodiment, to be stored together with the captured image.

Incidentally, even when the imaging range of the camera device is set to approximately 90 degrees or more in all directions, the imaging range around the camera apparatus 2 is 90 degrees in the upward and downward direction, but is 360 degrees omnidirectionally, namely, in the forward and rearward direction and the rightward and leftward direction, so that an all-around panoramic image around the camera apparatus can be captured and the distance can be measured.

Figure 10B:
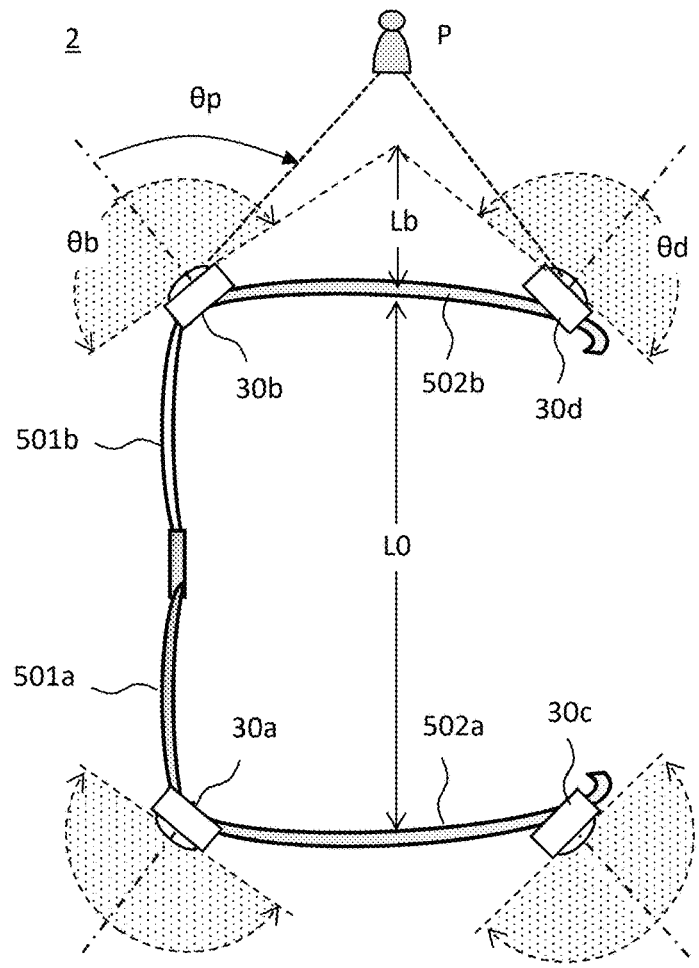
FIG. 10B is a view describing the accuracy of distance measurement by the eyeglass-type camera apparatus 2.

FIG. 10B is a view describing the accuracy of distance measurement by the eyeglass-type camera apparatus 2, and illustrates a plan view of the camera apparatus. The leftward direction of the drawing is a front lens 501 side. The camera devices 30a to 30d are attached to four corners of the eyeglass-type camera apparatus 2, and here, has an imaging angle of view of 180 degrees in each of the horizontal direction and the vertical direction.

When an image of the subject P is captured by the eyeglass type camera apparatus 2, the camera devices 30b and 30d are used, and the imaging angles of view of the camera devices are indicated by Gb and Gd. When the position of the subject P is at a longer distance from the temple 502b than a distance Lb, since both of the camera devices 30b and 30d can simultaneously catch the subject P, the distance can be measured. In this figure, when the distance Lb which is the shortest measurement distance is approximately 1/3 of an overall eyeglass width L0, and the overall eyeglass width L0 is, for example, 14 cm, a distance to the subject at the distance Lb=approximately 4.7 cm or more can be measured.

Here, the accuracy of measurement of the distance to the subject P will be contemplated. Regarding the accuracy of measurement of a general stereo camera method, the wider the interval between two cameras during simultaneous imaging is, the higher the accuracy is. For this reason, the accuracy of measurement is highest when the subject P to be imaged is located right in front of, behind, or in front of right and left sides of the eyeglass-type camera apparatus 2, and when the subject P is obliquely located at 45 degrees, the accuracy of distance measurement is reduced to $1/\sqrt{2}$ (=70%). This has the same impact on not only the accuracy of distance measurement but also a stereo effect when stereo images are obtained by using two arbitrary consecutive cameras.

This is the case when a general camera lens is used; however, the situation is different since the camera apparatus according to the present embodiment uses the fish-eye lens illustrated in FIG. 5 to perform imaging and distance measurement. When the camera device 30b catches the subject P, the subject P appears in the direction of an angle $\theta p$ with respect to the optical axis of the camera device 30b, and as described with reference to FIG. 5, the angle $\theta p$ and the distance from the center of the pixel on the sensor surface are represented by $x=f \cdot \theta p$ and are in a simple proportional relationship. For this reason, the accuracy of measurement of the distance to the subject does not depend on the interval between the camera devices, and the direction seen from the camera device is converted into an angle, and the accuracy of the angle becomes the accuracy of distance measurement.

Figure 10C:
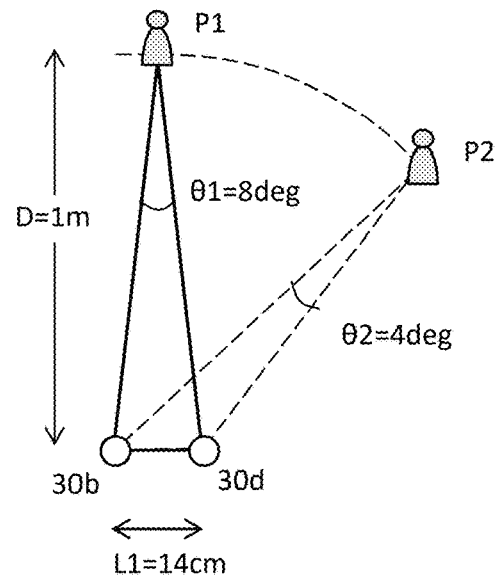
FIG. 10C is a view describing an impact of the direction of a subject on the accuracy of measurement.

FIG. 10C is a view describing an impact of the direction of the subject on the accuracy of measurement. A triangle connecting the subject P and the positions of the camera devices 30b and 30d which measure the subject is drawn. For example, when a distance D between the subject P and the camera devices 30b and 30d is 1 m, and an interval L1 between the camera devices 30b and 30d is 14 cm, when the subject P is located in front of the camera devices 30b and 30d (P1), an apex angle $\theta 1$ is approximately 8 degrees, and when the subject P is obliquely located at 45 degrees (P2), an apex angle $\theta 2$ is approximately 4 degrees.

As a result, the base angles of the two camera devices in each state are 172 degrees (180–8 degrees) and 176 degrees (180–4 degrees) in total, and the deviation is approximately 2%, and there is no big difference. As a result, when the optical system is configured using a fish-eye lens as in the present embodiment, and two of the camera devices mounted on the eyeglass-type camera apparatus 2 are selected to perform distance measurement, regardless of whether the position of the subject is located in front of or at an oblique position with respect to the eyeglass-type camera apparatus, the difference in accuracy of distance measurement is approximately 2% and the distance can be measured without a large error.

According to the second embodiment, similar to the first embodiment, a distance to the subject can be omnidirectionally measured while an image of the subject is omnidirectionally captured with high accuracy, and data of the image and the distance can be stored in correspondence therebetween. Particularly, the present embodiment is suitable when a user wears the camera apparatus for use.

REFERENCE SIGNS LIST 1, 2 Camera apparatus
10, 30 Camera device

20 Distance measurement device
21 Transmitter
22 Receiver
42 Display
300 Data file

The invention claimed is:

1. A camera apparatus that captures an image of a subject and measures a distance to the subject, the apparatus comprising:
a controller;
a memory;
two camera devices installed at positions that enable omnidirectional imaging from a viewpoint of the camera apparatus; and
two distance measurement devices installed at positions that enable omnidirectional distance measurement from the viewpoint of the camera apparatus,
wherein each of the two camera devices is configured by arranging a plurality of imaging pixels on a matrix and configured to capture image data,
wherein each of the two distance measurement devices is configured by arranging a plurality of distance measurement pixels on a matrix and configured to measure distance data,
wherein the plurality of imaging pixels are configured to be a different number of pixels than the plurality of distance measurement pixels, within a range where a positional relationship between the distance data and the image data can be maintained,
wherein, when the image data captured by the two camera devices and the distance data measured by the two distance measurement devices are stored in the memory as one data file, the controller is configured to acquire by imaging pixels that shoot a predetermined position of the subject as the image data,
wherein the controller is configured to acquire by distance measurement pixels that measure a distance of the predetermined position of the subject that are associated with each other for each pixel at a same position on the subject as the distance data,
wherein the controller is configured to associate coordinates on a sensor surface of each of the two distance measurement devices with coordinates on a sensor surface of each of the two camera devices,
wherein in a case where the subjects have different reflection coefficients, the controller is configured to calculate the distance from a power conversion value using only information of lower bits in data of received signals,
wherein the controller is configured to store the image data, the distance data and an attribute data in the memory as the one data file in an image data format,
wherein the attribute data includes an address information for a storing a position of the image data in the one data file and an address information for a storing a position of the distance data in the one data file,
wherein the attribute data further includes data pointer information that can be used to obtain the image data and the distance data that are associated with each other, and
wherein the controller is configured to execute associating the image data and the distance data based on the image pixels and the distance measurement pixels in accordance with the address information.

2. The camera apparatus according to claim 1,
wherein the two camera devices are installed on surfaces that face each other with respect to a principal surface of the camera apparatus, and
the two distance measurement devices are installed on surfaces that face each other with respect to a surface orthogonal to the principal surface of the camera apparatus.

3. The camera apparatus according to claim 1,
wherein at least one of the two camera devices captures the image of the subject at an angle of view of 180 degrees or more, and
at least one of the two distance measurement devices measures the distance to the subject at an angle of view of 180 degrees or more.

4. The camera apparatus according to claim 1,
wherein the two distance measurement devices are devices that measure the distance to the subject based on a time difference from when a radio wave or light of a predetermined wavelength is emitted until the radio wave or light is reflected by the subject to return to the devices.

5. The camera apparatus according to claim 1,
wherein the image data captured by the two camera devices and the distance data measured by the two distance measurement devices are both compressed and stored in the memory as the same file.

6. The camera apparatus according to claim 1, further comprising:
a display that displays the image data and the distance data stored in the memory,
wherein when a user touches the image of the subject displayed on the display, the distance to the subject touched is read from the memory to be displayed.

* * * * *